(12) United States Patent
Hirotani et al.

(10) Patent No.: US 12,630,100 B2
(45) Date of Patent: May 19, 2026

(54) VEHICLE EXTERIOR PART

(71) Applicant: TOYODA GOSEI CO., LTD., Kiyosu (JP)

(72) Inventors: Kozo Hirotani, Kiyosu (JP); Kimihiro Iimura, Kiyosu (JP); Kazuki Takao, Kiyosu (JP); Akihiro Hirose, Kiyosu (JP); Hiroyuki Nakano, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 933 days.

(21) Appl. No.: 17/898,603

(22) Filed: Aug. 30, 2022

(65) Prior Publication Data

US 2023/0097994 A1 Mar. 30, 2023

(30) Foreign Application Priority Data

Sep. 24, 2021 (JP) ................................. 2021-155658

(51) Int. Cl.
| | |
|---|---|
| B60R 13/00 | (2006.01) |
| H05B 3/06 | (2006.01) |
| H05B 3/84 | (2006.01) |

(52) U.S. Cl.
CPC ............. B60R 13/005 (2013.01); H05B 3/06 (2013.01); H05B 3/84 (2013.01)

(58) Field of Classification Search
CPC ............ B60R 13/005; H05B 3/06; H05B 3/84
See application file for complete search history.

(56) References Cited

U.S. PATENT DOCUMENTS

| | | | | |
|---|---|---|---|---|
| 5,672,397 | A * | 9/1997 | Bowers, Jr. ........... | B60R 13/005 |
| | | | | 428/31 |
| 6,607,409 | B2 * | 8/2003 | Machado ............. | H01R 11/282 |
| | | | | 439/855 |
| 10,272,877 | B2 * | 4/2019 | Lesmeister .............. | H05B 3/06 |
| 2007/0190849 | A1 * | 8/2007 | Yamamoto ............ | F21S 41/192 |
| | | | | 439/505 |
| 2015/0086731 | A1 * | 3/2015 | Sugiura ................... | B32B 37/18 |
| | | | | 156/196 |
| 2017/0313235 | A1 * | 11/2017 | Faoucher ................. | H05B 3/84 |
| 2018/0022274 | A1 * | 1/2018 | Kincade .............. | G02B 6/0085 |
| | | | | 362/23.09 |
| 2019/0306926 | A1 * | 10/2019 | Deering ................. | F21V 29/90 |
| 2021/0071841 | A1 * | 3/2021 | Folger ..................... | F21S 45/60 |
| 2021/0159592 | A1 * | 5/2021 | Kawashima ............. | G01S 7/03 |
| 2021/0370849 | A1 | 12/2021 | Yamada | |
| 2022/0209401 | A1 * | 6/2022 | Hong ..................... | H01Q 1/422 |
| 2022/0219623 | A1 | 7/2022 | Hirotani et al. | |
| 2022/0227031 | A1 * | 7/2022 | Onishi ............... | B29C 45/1418 |

(Continued)

FOREIGN PATENT DOCUMENTS

| | | |
|---|---|---|
| JP | 2020-005057 A | 1/2020 |
| JP | 2021-188917 A | 12/2021 |
| JP | 2022-108588 A | 7/2022 |

*Primary Examiner* — Woody A Lee, Jr.
(74) *Attorney, Agent, or Firm* — Posz Law Group, PLC

(57) ABSTRACT

A vehicle exterior part includes a body, a heater wire, a socket formed integrally with the body, and a connector pin. Part of the connector pin is embedded into the socket. The heater wire extends into the socket and is joined to the connector pin. The socket is configured to accept a power supply plug. The vehicle exterior part is configured such that the heater wire is energized via the power supply plug and the connector pin. The socket includes a thinned portion.

1 Claim, 4 Drawing Sheets

(56)         References Cited

U.S. PATENT DOCUMENTS

| | | |
|---|---|---|
| 2023/0016506 A1* | 1/2023 | Nakamura ............ G01S 7/4047 |
| 2023/0037082 A1* | 2/2023 | Situ .......................... C09K 5/14 |
| 2023/0118635 A1* | 4/2023 | Nakano .................. H05B 3/286 |
| | | 296/1.08 |
| 2024/0198928 A1* | 6/2024 | Moriya ................. G01S 13/931 |

* cited by examiner

VEHICLE EXTERIOR PART

BACKGROUND

1. Field

The present disclosure relates to a vehicle exterior part.

2. Description of Related Art

Vehicles (e.g., automobiles) are equipped with a sensor that transmits and receives electromagnetic waves (e.g., millimeter waves) used to detect an object outside of the vehicle. Such a sensor transmits electromagnetic waves toward the outside of the vehicle and receives the electromagnetic waves (reflected waves) that have struck and have been reflected by the object outside of the vehicle. By transmitting and receiving electromagnetic waves in this manner, the sensor detects the object outside of the vehicle. A vehicle exterior part is disposed on the front side of the vehicle in a direction in which electromagnetic waves are transmitted from the sensor. The vehicle exterior part is made of resin and permits the passage of electromagnetic waves. Examples of such a vehicle exterior part include an emblem, an ornament, and a mark. The vehicle exterior part makes the sensor hard to see from the outside of the vehicle.

However, when ice and snow adhere to the vehicle exterior part, the ability of electromagnetic waves to pass through the vehicle exterior part is lowered. To solve this problem, a heater wire may be disposed in the body of the vehicle exterior part as disclosed in Japanese Laid-Open Patent Publication No. 2020-5057. The heater wire is connectable to a power supply via a flexible printed circuit (FPC). Energizing the heater wire via the FPC causes the heater wire to generate heat, thereby melting the ice and snow that adhere to the vehicle exterior part. This limits situations in which the adhesion of ice and snow lowers the ability of electromagnetic waves to pass through the vehicle exterior part.

Also, a connector pin may be used to connect the heater wire to the power supply in a simpler manner. In this case, a socket protruding from the body of the vehicle exterior part is formed integrally with the body. Part of the connector pin is embedded in the socket. The heater wire extends into the socket and is connected to the connector pin. The socket is configured to accept a power supply plug. The heater wire is connected to the power supply via the power supply plug and the connector pin. This allows the heater wire to be energized.

In the case of connecting the heater wire of the vehicle exterior part to the power supply using the connector pin, the socket, where the connector pin is disposed, needs to be formed integrally with the body of the vehicle exterior part. Since the socket needs to be formed on the body, the vehicle exterior part will have an increased weight.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A vehicle exterior part that solves the above-described problem includes a body, a heater wire disposed in the body, a socket formed integrally with the body and protruding from the body, and a connector pin. Part of the connector pin is embedded into the socket. The heater wire extends into the socket and is joined to the connector pin. The socket is configured to accept a power supply plug. The vehicle exterior part is configured such that the heater wire is energized via the power supply plug and the connector pin. The socket includes a thinned portion.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle exterior part according to an embodiment will now be described with reference to FIGS. 1 to 6.

Figure 1:
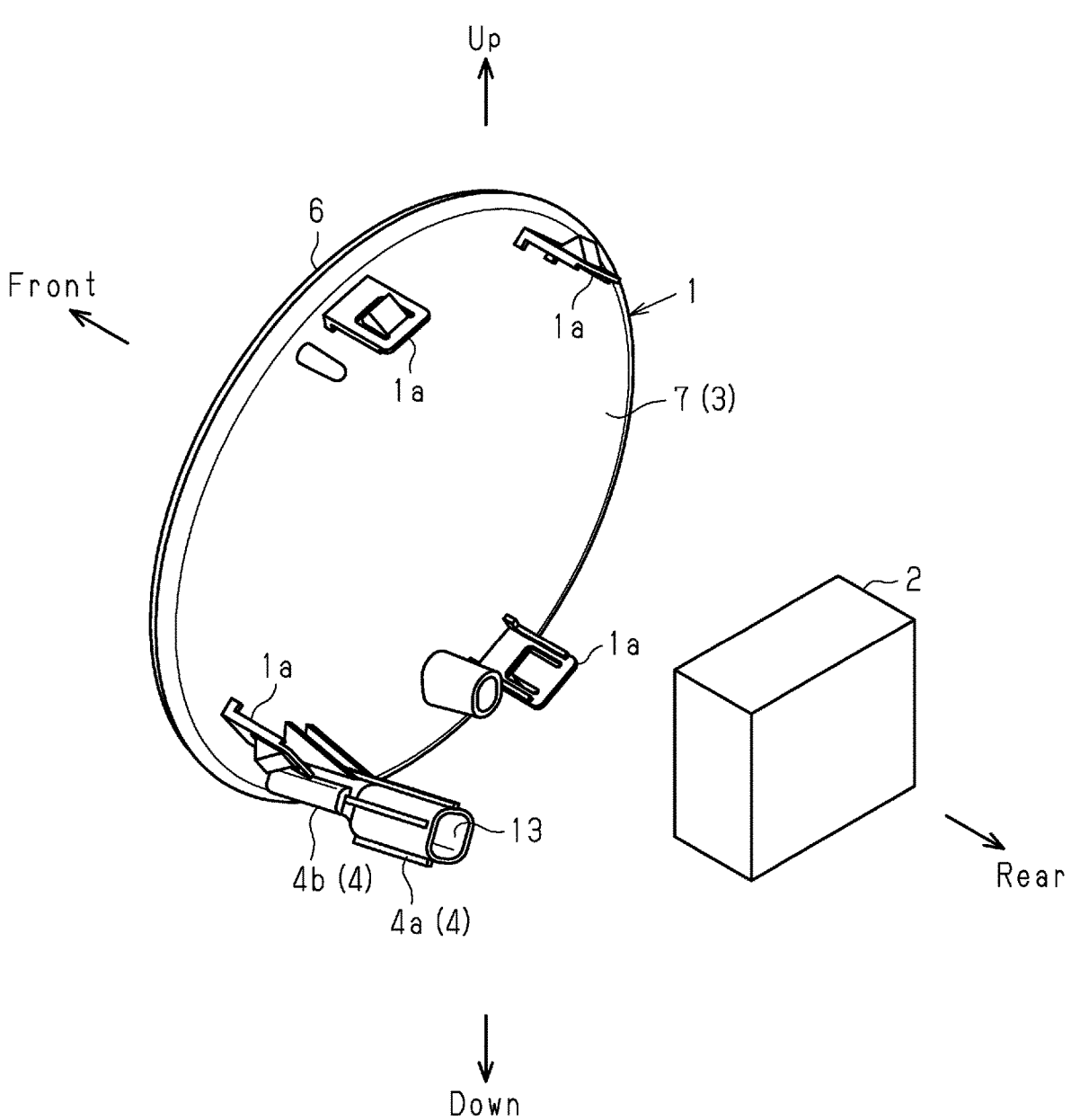
FIG. 1 is a perspective view showing an emblem and a sensor.
Figure 2:
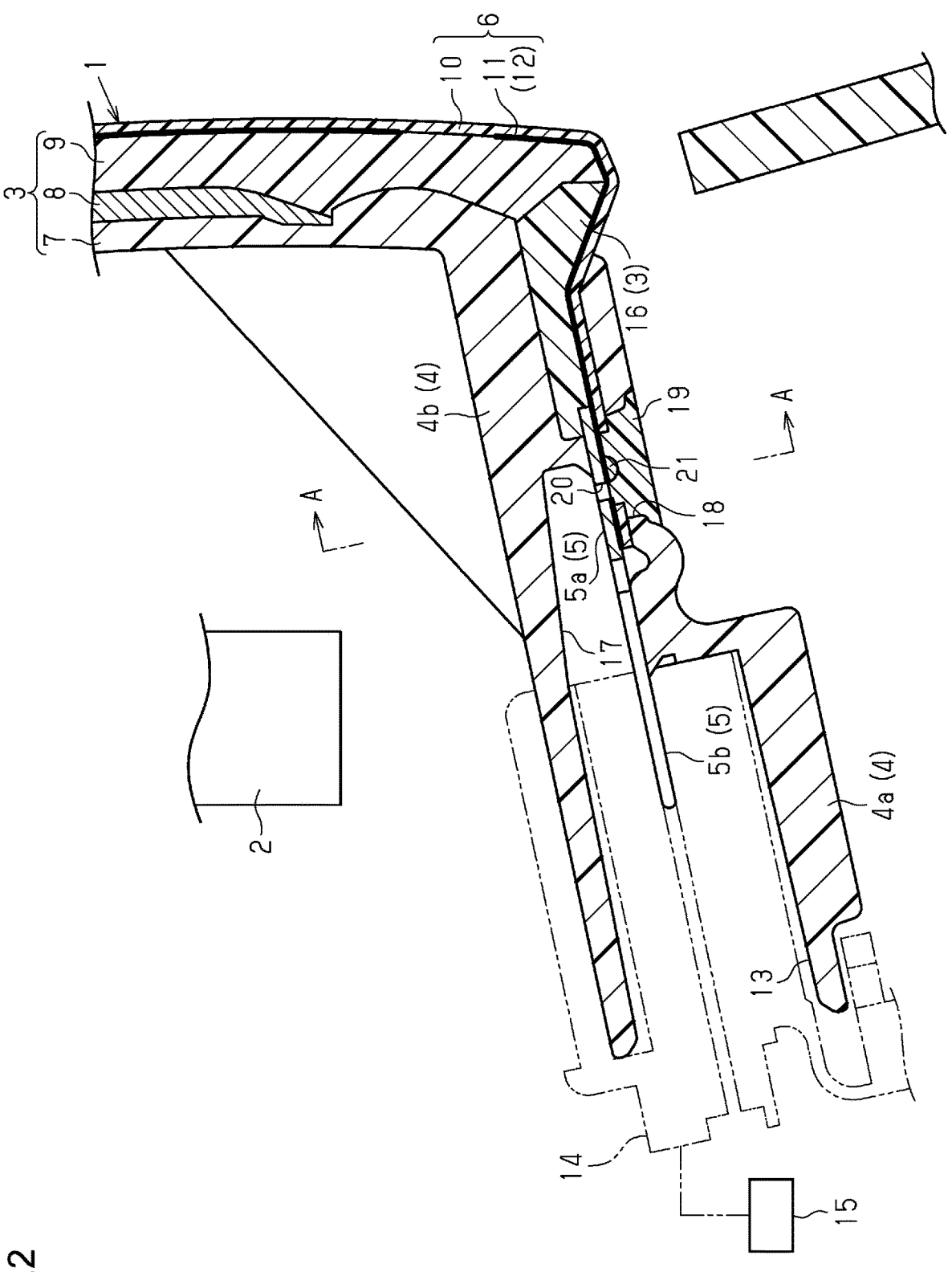
FIG. 2 is a cross-sectional view showing the lower end of the body and the socket in the emblem.

FIG. 1 shows an emblem 1 serving as the vehicle exterior part. FIG. 2 shows the lower end of the emblem 1. As shown in FIG. 1, a sensor 2 is disposed at a front part of the vehicle. The sensor 2 transmits electromagnetic waves (e.g., millimeter waves), which are used to detect an object outside of the vehicle, toward the outside of the vehicle and receives the electromagnetic waves (reflected waves) that have struck and have been reflected by the object outside of the vehicle. By transmitting and receiving electromagnetic waves in this manner, the sensor 2 detects the object outside of the vehicle.

The emblem 1 includes tabs 1a. The emblem 1 is coupled to the front part of the vehicle by the tabs 1a. The emblem 1 is located on the front side in a direction in which electromagnetic waves are transmitted from the sensor 2, and permits the passage of electromagnetic waves. The emblem 1 is located in front of the sensor 2 so that the emblem 1 makes the sensor 2 hard to see from the outside of the vehicle.

As shown in FIG. 2, the emblem 1 includes a body 3, a socket 4, a connector pin 5, and a heater sheet 6. The body 3, socket 4, connector pin 5, and heater sheet 6 will now each be briefly described.

Body 3

The body 3 includes a base 7, a decorative layer 8, a transparent layer 9, and a frame 16. The base 7 is made of resin and has a plate shape. The base 7 permits the passage of millimeter waves. The base 7 is coupled to the vehicle and is formed integrally with the tabs 1a (FIG. 1). On the front surface (the right surface in FIG. 2) of the base 7, the decorative layer 8 and the transparent layer 9 are located in this order in a direction (the right direction in FIG. 2) in which millimeter waves are transmitted from the sensor 2.

Figure 3:
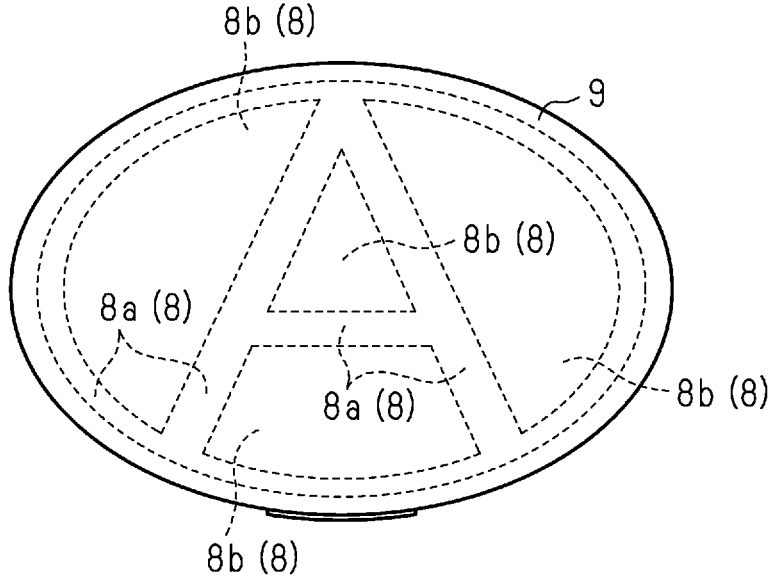
FIG. 3 is a front view showing the decorative layer and the transparent layer of the body, as seen from the right side of FIG. 2.

FIG. 3 shows the decorative layer 8 and the transparent layer 9, as seen from the right side of FIG. 2. The transparent layer 9 is made of a colorless or colored transparent resin that permits the passage of millimeter waves. The decorative layer 8 includes a pattern region 8a and a background region 8b, and permits the passage of millimeter waves. The pattern region 8a and the background region 8b are located on the emblem 1, for example, in a manner shown in FIG. 3. The pattern region 8a and the background region 8b are used to improve the design of the emblem 1.

The frame 16 (FIG. 2) is made of resin. The frame 16 extends along the outer edge of the base 7 in an annular manner. The frame 16 is welded to the base 7 and the transparent layer 9. Thus, the base 7 and the transparent layer 9 are coupled to each other by the frame 16.

Heater Sheet 6

As shown in FIG. 2, the heater sheet 6 is located on the front surface (the right surface in FIG. 2) of the transparent layer 9. The heater sheet 6 includes a sheet body 10 and heater wires 11, 12. The sheet body 10 is made of transparent resin and permits the passage of electromagnetic waves. The heater wires 11, 12 are located on the rear surface (the left surface in FIG. 2) of the sheet body 10. The heater wires 11, 12 are made of a metal material that generates heat when energized.

Figure 4:
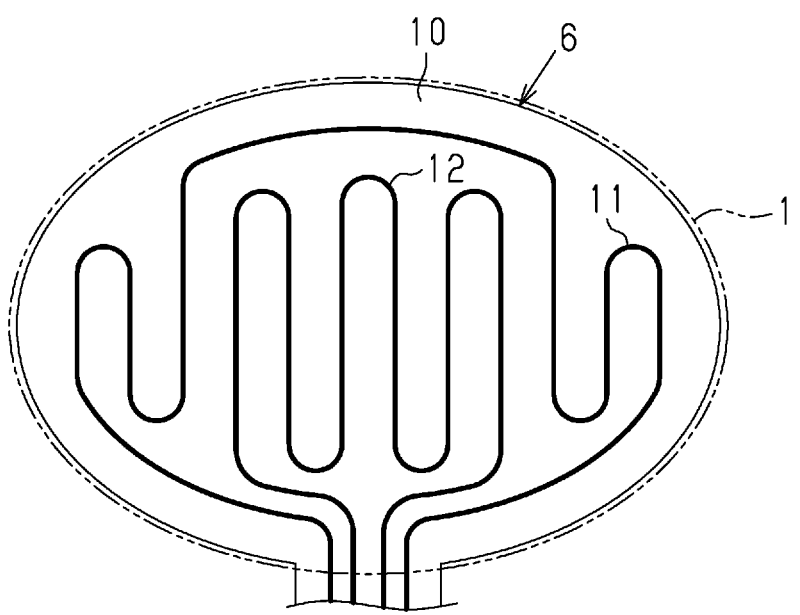
FIG. 4 is a front view showing the heater sheet, as seen from the right side of FIG. 2.

FIG. 4 shows the heater sheet 6, as seen from the right side of FIG. 2. As shown in FIG. 4, the heater wires 11, 12 are each arranged in a different wiring pattern. The ends of the heater wires 11, 12 concentrate at the lower end of the emblem 1. When the heater wires 11, 12 are energized to generate heat, the heat melts the ice and snow that adhere to the emblem 1. This limits situations in which the adhesion of ice and snow lowers the ability of electromagnetic waves to pass through the emblem 1.

Socket 4

As shown in FIG. 2, the socket 4 is located at the lower end of the base 7 of the body 3, and is formed integrally with the base 7 (body 3). The socket 4 protrudes in a direction from the lower end of the outer edge of the base 7 toward the inside of the vehicle. That is, the socket 4 protrudes leftward in FIG. 2. The socket 4 includes a distal end 4a in the protruding direction. The distal end 4a includes a recess 13 configured to accept a power supply plug 14. The power supply plug 14 is connected to a power supply 15.

The socket 4 includes a basal end 4b. The frame 16 is embedded in the basal end 4b; that is, in a portion of the socket 4 closer to the base 7 than the recess 13. The sheet body 10 and the heater wires 11, 12 of the heater sheet 6 extend to the basal end 4b of the socket 4 and are embedded in the basal end 4b along the frame 16. The basal end 4b of the socket 4 includes a thinned portion 17. The thinned portion 17 extends from the bottom of the recess 13 toward the frame 16.

The socket 4 includes a window 18. The window 18 is located at the basal end 4b of the socket 4. The window 18 opens toward the outside of the socket 4 (downward in FIG. 2), and is connected to the thinned portion 17. The heater wires 11, 12 of the heater sheet 6 extend to the window 18 through the basal end 4b of the socket 4. The window 18 is sealed by a water sealing portion 19. The water sealing portion 19 is made of resin that is softer than that of the socket 4. That is, the emblem 1 includes the water sealing portion 19 that seals the window 18.

Connector Pin 5

The connector pin 5 is located in the socket 4. The connector pin 5 includes a plate 5a and a terminal 5b. The plate 5a, which is a part of the connector pin 5, is embedded in the basal end 4b of the socket 4 and separates the thinned portion 17 from the window 18. The plate 5a includes holes 20 that connect the thinned portion 17 to the window 18. The ends of the heater wires 11, 12 are joined to the plate 5a by joints 21. The joints 21 are located in correspondence with the window 18.

Figure 5:
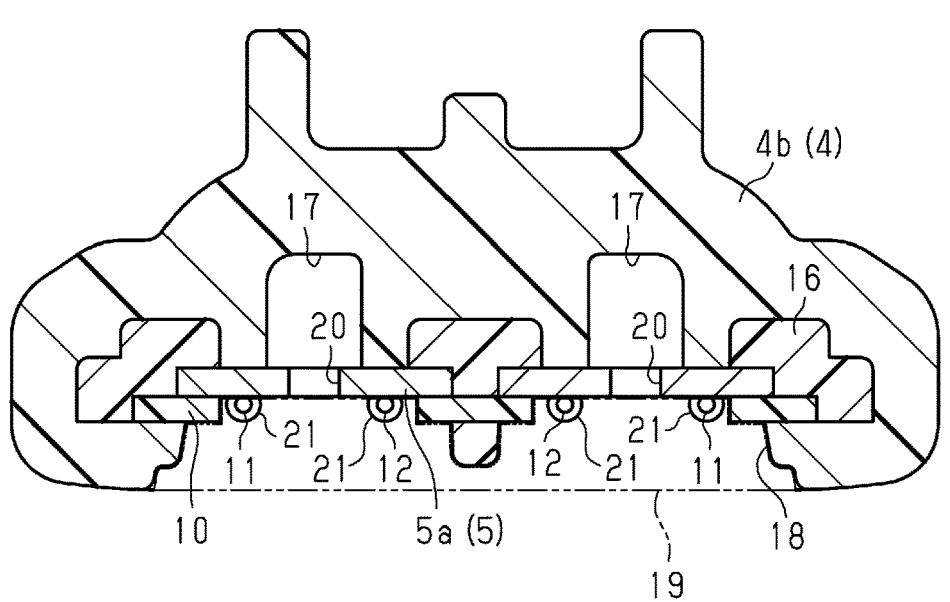
FIG. 5 is a cross-sectional view showing the connector pin and its surroundings in the socket, as seen in the direction of arrows A-A in FIG. 2.

FIG. 5 shows the connector pin 5 and its surroundings in the socket 4, as seen in the direction of arrows A-A in FIG. 2. FIG. 5 shows a state where the window 18 has not been sealed by the water sealing portion 19 and the ends of the heater wires 11, 12 and the plate 5a are exposed through the window 18. In this state, the joints 21 are formed by soldering the ends of the heater wires 11, 12 to the plate 5a. The plate 5a of the connector pin 5 does not have to be joined to the heater wires 11, 12 through soldering. Instead, they may be joined through, for example, adhesion using a conductive adhesive or welding.

Figure 6:
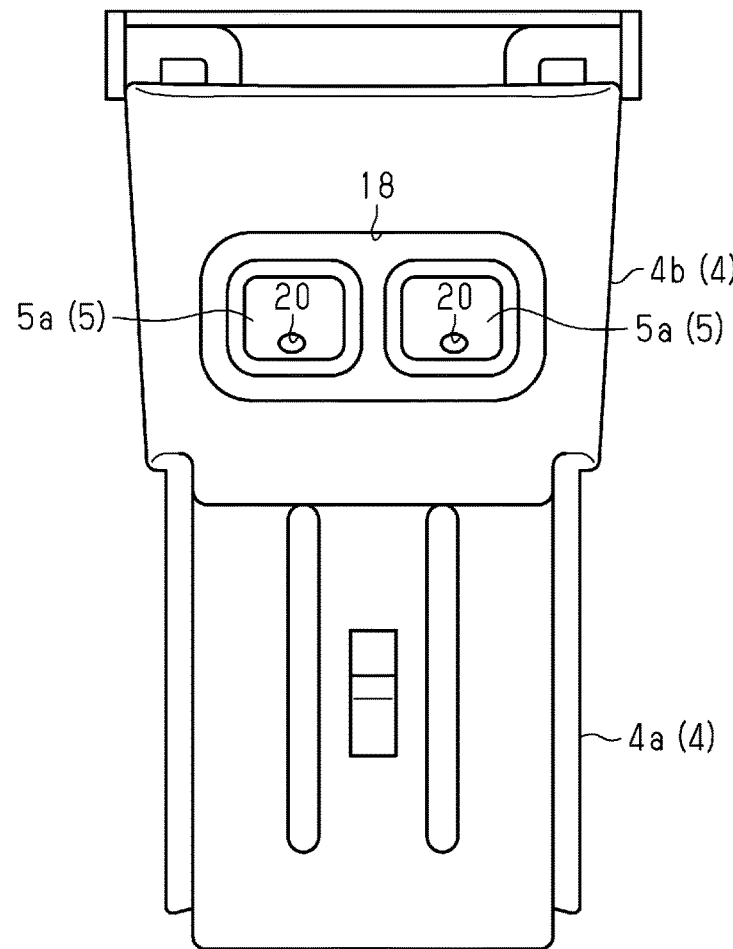
FIG. 6 is a bottom view showing the socket in which the plate and the heater wire have not been joined to each other, as seen from the lower side of FIG. 5.

FIG. 6 shows the socket 4 in which the plate 5a and the heater wires 11, 12 have not been joined to each other by the joints 21, as seen from the lower side of FIG. 5. In this state, the window 18 opens as shown in FIG. 6. This allows the joining of the plate 5a and the heater wires 11, 12 to be performed through the window 18. After the plate 5a is joined to the heater wires 11, 12, the window 18 is sealed by the water sealing portion 19 as shown by the broken line in FIG. 5. In this state, the joints 21 are covered by the water sealing portion 19.

As shown in FIG. 2, the terminal 5b of the connector pin 5 protrudes from the plate 5a into the recess 13 of the socket 4. When the power supply plug 14 is inserted into the recess 13 of the socket 4, the terminal 5b of the connector pin 5 is connected to the power supply plug 14. This causes the heater wires 11, 12 of the heater sheet 6 to be connected to the power supply 15 via the connector pin 5 and the power supply plug 14 and allows the heater wires 11, 12 to be energized.

The thinned portion 17 of the socket 4 will now be described in detail.

The thinned portion 17 extends from the bottom of the recess 13 of the socket 4 toward the frame 16. The thinned portion 17 is connected to the window 18 through the holes 20 of the connector pin 5. In other words, in a state where the power supply plug 14 is not inserted into the recess 13, the thinned portion 17 extends so as to connect the outside of the socket 4 to the inside of the window 18; more specifically, the thinned portion 17 extends so as to connect them through the recess 13 of the socket 4 and the holes 20 of the connector pin 5. Thus, the thinned portion 17 is used for airtightness testing between the window 18 and the water sealing portion 19.

In the airtightness testing, high-pressure fluid for inspection is supplied into the thinned portion 17 to inspect whether the airtightness between the window 18 and the water sealing portion 19 is enough. When the airtightness between the window 18 and the water sealing portion 19 is enough, the inspection fluid does not leak out of the space between the window 18 and the water sealing portion 19. When the airtightness between the window 18 and the water sealing portion 19 is not enough, the inspection fluid leaks out of the space between the window 18 and the water sealing portion 19. In such a manner, the airtightness testing is performed by supplying high-pressure fluid for inspection into the thinned portion 17. The thinned portion 17 is used as a hole for the airtightness testing.

The operational advantages of the vehicle exterior part (emblem 1) of the present embodiment will now be described.

(1) By inserting the power supply plug 14 into the socket 4, the heater wires 11, 12 are connected to the power supply 15 via the power supply plug 14 and the connector pin 5. This allows the heater wires 11, 12 to be energized. Thus, the heater wires 11, 12 are easily connected to the power supply 15. Further, the socket 4 includes the thinned portion 17 and thus has a reduced weight. This limits an increase in the weight of the socket 4 while allowing the heater wires 11, 12 to be connected to the power supply 15 using the connector pin 5.

(2) The socket 4 includes the thinned portion 17 and is thus thin. Thus, in a case where the base 7 including the socket 4 is formed through injection-molding or the like, shrinkage (sink marks) that occurs subsequent to the molding is less likely to occur around the thinned portion 17 of the socket 4.

(3) The temperature of the connector pin 5 is increased by the generation of heat resulting from energization of the connector pin 5 and decreased by subsequent suspension of the energization. If such a cycle is repeated, the temperature changes of the connector pin 5 deform the connector pin 5. This may cause the plate 5a to be detached from the heater wires 11, 12. However, since the thinned portion 17 formed in the socket 4 is adjacent to the connector pin 5, the connector pin 5 is exposed to the thinned portion 17. Thus, when the connector pin 5 generates heat, the heat is readily released from the connector pin 5 to the thinned portion 17. This limits temperature increases in the connector pin 5 that occur when the connector pin 5 generates heat when energized, and lowers temperature changes in the connector pin 5 that are caused by repeating energization and suspension of the energization. As a result, the deformation of the connector pin 5 that results from such temperature changes is small. Accordingly, the detachment of the plate 5a from the heater wires 11, 12 that results from the deformation is prevented.

(4) Airtightness testing is performed by supplying high-pressure fluid for inspection into the thinned portion 17 to check the airtightness between the window 18 and the water sealing portion 19. In other words, the thinned portion 17 is used as a hole for the airtightness testing. Thus, an additional hole having such a function does not need to be prepared.

The above-described embodiment may be modified as follows. The above-described embodiment and the following modifications can be combined as long as the combined modifications remain technically consistent with each other.

The socket 4 does not necessarily have to be located at the lower end of the body 3; more specifically, at the lower end of the base 7.

The thinned portion 17 does not need to function as a hole into which inspection fluid for airtightness testing is supplied. In this case, the thinned portion 17 does not have to be connected to the window 18 and may be located at another position in the socket 4.

The heater sheet 6 may include one heater wire or may include three or more heater wires.

Millimeter waves do not have to be transmitted in a direction from the sensor 2 toward the front side of the vehicle. Instead, for example, millimeter waves may be transmitted toward the lateral sides of the vehicle or toward the rear side of the vehicle.

The sensor 2 may transmit and receive electromagnetic waves other than millimeter waves. Examples of such electromagnetic waves include infrared rays or laser.

The emblem 1 is employed as an example of the vehicle exterior part. Instead, another vehicle exterior part (e.g., an ornament or a mark) may be used.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle exterior part, comprising:
a body;
a heater wire disposed in the body;
a socket formed integrally with the body and protruding from the body; and
a connector pin, part of the connector pin being embedded into the socket, wherein
the heater wire extends into the socket and is joined to the connector pin,
the socket is configured to accept a power supply plug,
the vehicle exterior part is configured such that the heater wire is energized via the power supply plug and the connector pin,
the socket includes a thinned portion,
the connector pin and the heater wire are joined to each other by a joint,
the socket includes a window that exposes the joint to an outside of the socket,
the vehicle exterior part further comprises a water sealing portion that seals the window and the joint, and
the thinned portion extends so as to connect the outside of the socket to an inside of the window.

* * * * *